FRANCIS J. TAYLOR, JR.
INVENTOR.

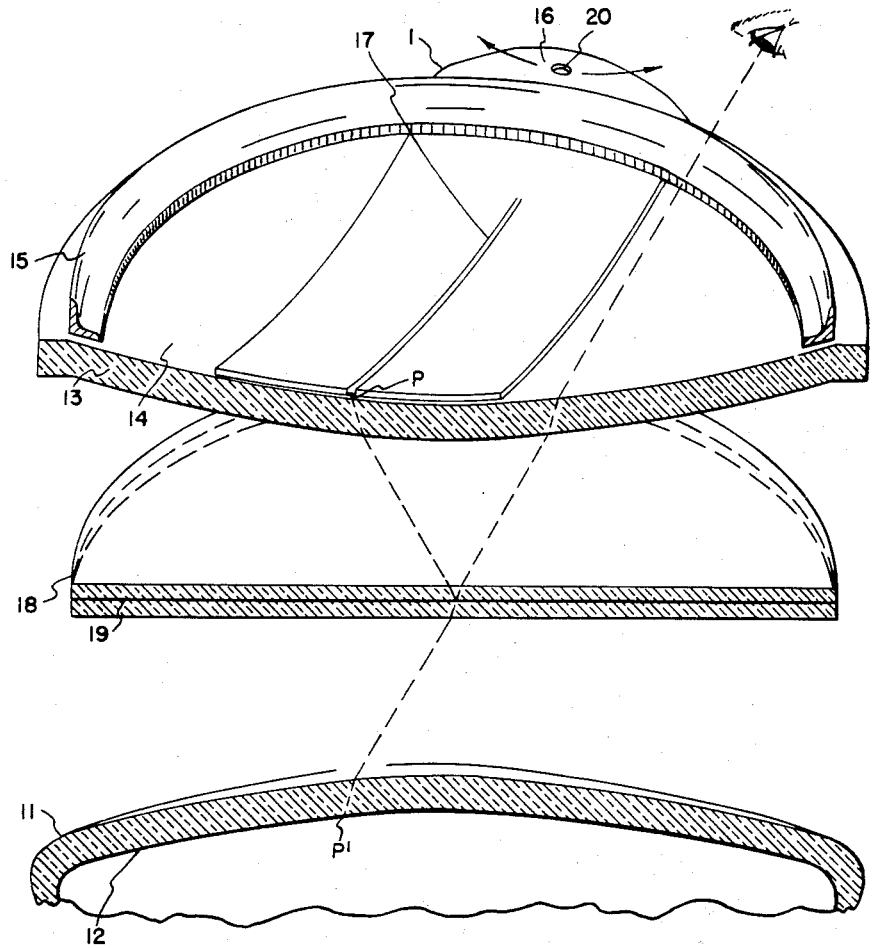
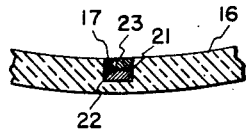
Fig. 1
Fig. 2
FRANCIS J. TAYLOR, JR.
*INVENTOR.*
BY
*Kellman and Kerst*
ATTORNEYS

BY

*Killman and Kerst*
ATTORNEYS

United States Patent Office 2,707,902
Patented May 10, 1955

2,707,902

OPTICAL SYSTEM FOR CATHODE-RAY TUBES

Francis J. Taylor, Jr., Mission, Kans., assignor to Bendix Aviation Corporation, Towson, Md., a corporation of Delaware Application October 23, 1951, Serial No. 252,617

5 Claims. (Cl. 88—74)

This invention relates to an improved optical system and more particularly to an improved system for eliminating parallax in optical superposition devices having displays on curved surfaces, such for example, as cathode-ray screens.

Prior art superposition devices of this type are well known and an example of such a device may be found schematically illustrated in Fig. 16.23 of vol. 22 of the MIT Radiation Laboratory Series. Devices of this type suffer from an inherent limitation which results in parallax errors due to the impossibility of optically aligning the cathode-ray tube display and the map or plot with which it is to be superposed. Other devices have attempted to place the map or plot directly on the tube face and coextensive with the useful portion of the fluorescent screen. Such devices are objectionable electrically in that the motion of the plotting device deflects or defocuses the electron beam and optically in that parallax still exists due to the thickness of the map and glass tube face which separates the map surface and the fluorescent screen.

It is an object of the present invention to provide the complete elimination of parallax between optically superposed images.

Another object is to provide, by optical superposition, the exact coincidence of the image of a plot on the fluorescent screen of a cathode-ray tube.

A further object is to provide an optical superposing system in which the desired optical distance to the objects may be readily obtained.

Another object is to provide an improved cursor for obtaining good visibility in a parallax-free plotting of an image on a curved surface.

A further object is to provide an improved cursor mounting and moving means.

These and other objects of the present invention are obtained by providing a plotting surface which is of inverse curvature with respect to the surface with which it is to be brought into optical coincidence. A semi-reflecting-transmitting plane surface interposed between the oppositely curved surfaces provides a point-to-point coincidence between the direct view by transmission through the plane surface of an object in the subjacent curved surface and the image of an object reflected from the superjacent curved surface. A cursor is constrained to move on the superjacent curved surface and thus plots in optical coincidence with the superposed image and object. By providing equal optical viewing distances to the superposed object and image the entire display is free of parallax errors regardless of the angle of view.

The objects and advantages of the invention will be better understood upon consideration of the following detailed description when taken in conjunction with the drawings wherein:

Fig. 1 is a perspective view partly in section of the system of the invention;

Fig. 2 is an enlarged sectional view of the cursor;

Figure 3:
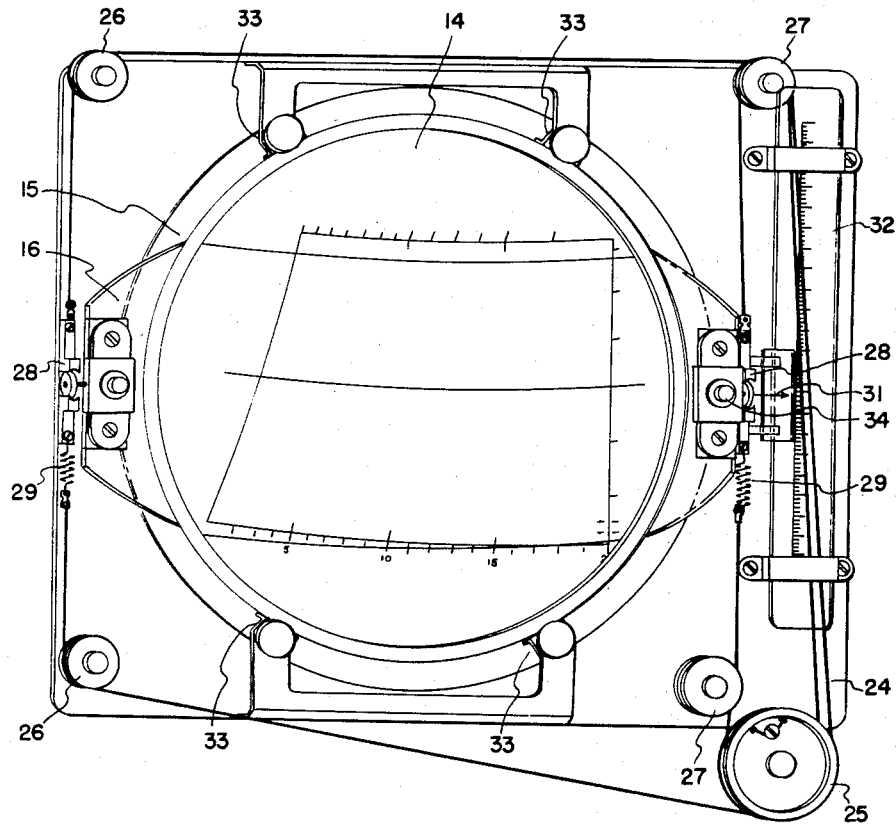
Fig. 3 is a perspective view of a plotting board in accordance with the invention.

Referring to Fig. 1 the system of the invention is shown for use with a cathode-ray tube 11 having a fluorescent screen 12 on the inner surface thereof which is substantially spherical. Axially aligned with the screen 12, but oppositely curved with respect thereto, is a plotting surface support 13 having a spherical surface 14 suitable to support a transparent map or the like and substantially congruent with the surface of the screen 12. A ring member 15 is mounted in spaced relation to the support surface 13 and has an internal diameter such that it surrounds the useful viewing surface 14. A spherical-arc cursor member 16 is slidably mounted between the ring 15 and support 13 and is constrained to move in essentially sliding contact with the surface 14 by ring 15. An index 17 is provided in the surface of cursor 16 opposite that which is in contact with the surface 14. The thickness and the material chosen for support 13 are preferably such that the length of the optical path therethrough is equal to that through the spherical portion of the envelope of tube 11 having screen 12 thereon.

Positioned between the support 13 and the tube 11 is a semi-reflecting plane mirror 18 having a reflecting surface 19 which is normal to a line between the centers of the spheres of which the surfaces 12 and 14 are a part. The mirror surface 19 is midway between the total thickness of the mirror 18 to provide identical path lengths for transmitted and reflected light. The position of the mirror 18 is such that the reflected light path from the point P on the surface 14 to the observer's eye is the same optical length as the transmitted light path from the point P' on the screen 12. This position is physically midway between the surfaces 12 and 14 when the tube 11 and support 13 are made of material having the same index of refraction and are of equal thickness.

Referring to Fig. 2 the details of the index 17 in the cursor 16 are shown. A groove 21 is cut into the upper side of the cursor 16. This groove is initially filled with an opaque relatively reflecting paint 22 or the like to render the index line 17 visible when illuminated by edge lighting the cursor 16 and viewed by reflection in mirror 18. The groove 21 is then filled with a black ink 23 or other non-reflecting material, thereby rendering the line invisible when directly viewed in a darkened room. The cursor 16 may be edge lighted by inserting a small lamp, not shown, into a hole 20, shown in Fig. 1.

Referring to Fig. 3, there is shown a pair of belts 24 disposed on a pulley system 25, 26 and 27. The pulley sets 26 and 27 have disposed between the respective pulleys thereof on the cord segments therebetween yokes 28 and tension springs 29. The yokes 28 are adapted to pivotally mount the spherical cursor 16, as will be more fully described hereinafter, and permit a concentric motion of the cursor 16 over the surface 14 as the yokes 28 are translated between their respective pulleys 26 and 27. Associated with one of the yokes 28 is a pointer 31 for indicating values of a suitable variable, for example, altitude, along an adjacent fixed scale 32. The ring 15 is supported by overhanging brackets 33 located in positions near the limit of the motion of the cursor 16 to prevent interference therewith. The cursor 16 is edge lighted by means of a lamp in a housing assembly 34.

Figure 4:
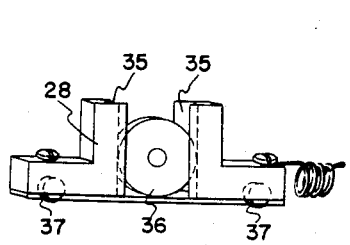
Fig. 4 is a perspective view of the yoke assembly.
Figure 5:
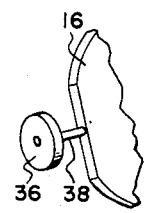
Fig. 5 is a fragmentary view of one end of the cursor.

In Fig. 4 there is shown one of the yokes 28 having curved edges 35 providing an opening therein adapted to receive a pivot wheel 36. The yoke 28 may be provided with rollers 37 if desired. Fig. 5 shows one end of the cursor 16 having the pivot wheel 36 mounted thereon by means of a pin 38 embedded in the plastic cursor 16. The wheels 36 on opposite ends of the cursor 16 when seated in the openings in yokes 28 provide a pivot mounting of the cursor 16.

In the operation of the device in accordance with the present invention the intermediate position of the mirror 18 is adjusted to the optical midpoint to bring about optical coincidence between points P and P'. Then all points of a transparent map placed on the surface 14 may be observed with respect to the fluorescent display on the screen 12 without parallax errors and from any point of view. Motion imparted to the yoke 28 moves the cursor 16 which is constrained by the track formed between the support 13 and the ring 15 to keep the index line 17 in the upper side of the cursor 16 spaced only a small distance from the surface 14. The motion of the cursor 16 is normal to the line 17 and hence this curved line or arc 17 remains an arc of a great circle on the spherical surface 14. It thus represents a straight line in the plane represented by the spherical surface displays.

Obviously, other arrangements are apparent in the light of the present teaching and are to be understood as being within the scope of the present invention. For example, curved surfaces other than spherical could be employed providing that they are congruent over the area of interest and are disposed on opposite sides of a semi-reflecting plane with equal optical paths from the two surfaces to the eye of the observer.

What is claimed is:

1. An anti-parallax device for superposing a map and a cathode-ray viewing screen having a curved surface comprising, a map element mounted in spaced relation to, and in the path of vision of said screen, said element having a surface which is substantially congruent to said screen and the congruent surfaces of said element and screen facing opposite directions along said path of vision, a pair of transparent plates of equal thickness in face-to-face adjacency, a semi-reflecting-transmitting mirror surface at the plane of adjacency of said plates, and means for disposing said plates with said plane between said congruent surfaces at equal optical distances therefrom.

2. An anti-parallax device for superposing a map and a cathode-ray viewing screen having a substantially spherical-portion surface comprising, a map-surface element substantially congruent to said screen mounted in spaced relation to and in the path of vision of said screen, the congruent surfaces of said element and screen facing opposite directions along said path of vision, a ring member mounted in superjacent relation to the periphery of the spherical-portion of said map element, a spherical-arc indexing element movable in sliding adjacency to said map surface and extending between said map surface and said ring member for guiding the motion thereof, a pair of transparent plates of equal thickness in face-to-face adjacency, a semi-reflecting-transmitting mirror surface at the plane of adjacency of said plates, and means for disposing said plates with said plane between said congruent surfaces at equal optical distances therefrom.

3. An anti-parallax device for superposing a map and a cathode-ray viewing screen having a substantially spherical-portion surface comprising, a map-surface element substantially congruent to said screen mounted in spaced relation to and in the path of vision of said screen, the congruent surfaces of said element and screen facing opposite directions along said path of vision, a ring member mounted in superjacent relation to the periphery of the spherical-portion of said map element, a spherical-arc indexing element movable in sliding adjacency to said map surface and extending between said map surface and said ring member for guiding the motion thereof, a pair of pivot members in respective ends of the extended portions of said spherical-arc element, a pair of guide members movable in parallel translation along lines adjacent opposite edges of said map-surface, means on said guide members for pivotally receiving said pivot members and for imparting said translation to said indexing element, and a plane semi-reflecting-transmitting mirror disposed between said congruent surfaces at equal optical distances therefrom.

4. An optical superposition device comprising a first display means comprising a curved sheet of transparent material having a substantially uniform thickness, a second display means comprising a sheet of transparent material congruent to said curved sheet of said first display means, means mounting said sheets in spaced relation with the congruent surfaces thereof facing opposite directions, means for presenting a display on one surface of each of said sheets, said display surfaces being in each case the surface facing away from the other of said sheets, a pair of plates of transparent material in face-to-face adjacency, a semi-reflecting-transmitting mirror surface at the plane of adjacency of said plates, and means for disposing said plates between said first and second curved sheets, the aggregate thicknesses of the transparent material between said plane and each of said display surfaces being substantially equal.

5. An optical superposition device as set forth in claim 4, characterized in that said sheets are symmetrically disposed about said plane of adjacency of said plates, that said plates are of substantially equal thickness and that said sheets are of substantially equal thickness.

References Cited in the file of this patent

UNITED STATES PATENTS

| | | |
|---|---|---|
| 1,176,313 | Pfund | Mar. 21, 1916 |
| 1,199,882 | Frey | Oct. 3, 1916 |
| 1,529,643 | Fenderl | Mar. 10, 1925 |
| 2,171,571 | Karnes | Sept. 5, 1939 |
| 2,293,138 | Hayward | Aug. 18, 1942 |
| 2,578,965 | Blok | Dec. 18, 1951 |
| 2,580,240 | Newman | Dec. 25, 1951 |
| 2,588,035 | O'Neil | Mar. 4, 1952 |